United States Patent [19]

Miyadera et al.

[11] Patent Number: 4,959,778
[45] Date of Patent: Sep. 25, 1990

[54] ADDRESS SPACE SWITCHING APPARATUS

[75] Inventors: Hiroo Miyadera, Atsugi; Toru Ohtsuki; Toshiaki Kawamura, both of Hadano, all of Japan

[73] Assignee: Hitachi, Ltd., Tokyo, Japan

[21] Appl. No.: 251,841

[22] Filed: Sep. 30, 1988

[30] Foreign Application Priority Data

Oct. 2, 1987 [JP] Japan ............................... 62-247798

[51] Int. Cl.$^5$ .............................................. G06F 9/34
[52] U.S. Cl. .............................. 364/200; 364/255.1; 364/255.2
[58] Field of Search ... 364/200 MS File, 900 MS File

[56] References Cited

U.S. PATENT DOCUMENTS

| | | | |
|---|---|---|---|
| 3,979,729 | 9/1976 | Eaton et al. | 364/200 |
| 4,003,033 | 1/1977 | O'Keefe et al. | 364/200 |
| 4,149,244 | 4/1979 | Anderson et al. | 364/200 |
| 4,244,019 | 1/1981 | Anderson et al. | 364/200 |
| 4,453,212 | 6/1984 | Gaither et al. | 364/200 |
| 4,651,274 | 3/1987 | Omoda et al. | 364/200 |
| 4,670,839 | 6/1987 | Pilat et al. | 364/200 |
| 4,675,806 | 6/1987 | Uchida | 364/200 |

FOREIGN PATENT DOCUMENTS 6053895 11/1985 Japan.

Primary Examiner—David Y. Eng
Attorney, Agent, or Firm—Antonelli, Terry, Stout & Kraus

[57] ABSTRACT

An address space switching apparatus has a group of conventional registers capable of storing address information and a group of additional registers capable of storing address information longer than the address information stored by the group of conventional registers. The register length of the group of additional registers is not restricted by the length of the group of conventional registers and is selected to be of a magnitude sufficient to define a desired operand address space. Information items stored in the group of additional registers such as a base address and an index value associated with the extended address space are selected when an operand address is to be generated so as to be appropriately employed for the address computation, thereby supplying address information having a length sufficient for the extended address space. On the other hand, when an address other than an operand address is to be created, information items stored in the group of conventional registers are selected so as to be utilized in the address computation.

10 Claims, 2 Drawing Sheets

ADDRESS SPACE SWITCHING APPARATUS

BACKGROUND OF THE INVENTION

The present invention relates to an address specifying mechanism in a computer, and in particular, to an address space switching or change-over apparatus suitable for extending an address space.

In scientific and technological computations and data base processing, the amount of data to be processed has recently been increasing. In order to efficiently process a great amount of data, it is desirable in general that a large address space is available for a computer. However, if the address space is extended for any processing, it is necessary to change specifications of almost all the instructions and to prepare a large number of new instructions, and as a result, the size of the hardware is increased and a great amount of the existing software is required to be modified.

In order to solve the problems above, there has been proposed a system in which only an address space for data (only an operand address space) is extended and an address space for instructions, namely, an instruction address space is kept remained as in the conventional system. An example of such a system has been described in the Japanese Patent Examined Publication No. JP-B-60-53895. The instruction address rarely becomes insufficient for a program to process a great amount of data. In many cases, the processing efficiency can be remarkably improved by extending only the operand address space. In consequence, it can be regarded as a practical approach to extend only the operand address.

However, in the conventional computer of the type described above, the address extension is restricted by the address space defined by a length (for example, a work length, and in general, the number of bits of a group of registers) of an information unit which can be processed at a time by the computer in association with the structure thereof and therefore it is impossible to exceed the limit in the operand address extension.

SUMMARY OF THE INVENTION

It is therefore an object of the present invention to extend the limit of extension of the operand address space.

According to the present invention, there is disposed an address space switching apparatus comprising an address adder, a group of registers for storing address information, a group of additional registers for storing address information of which the length is greater than the address information kept in the group of registers, a selector controlled by a first control signal so as to respectively select an output from the group of registers or an output from the group of additional registers depending on a first state or a second state of the first control signal, thereby supplying the output to the address adder, an operand access control unit for generating a second control signal indicating a period of time for generating an operand address, and a mode control unit selector for receiving the second control signal to generate the first control signal having the second state in a time period for generating an operand address and having the first state in a time period for generating an address other than an operand address.

The register length of the group of additional registers is not restricted by that of the group of ordinary registers, namely, the length can be selected to be of a magnitude sufficient to define a desired operand address space. A base address of the extended address space, an index value thereof, etc. are kept in the group of additional registers. These information items are used in an address computation when an operand address is to be generated, thereby supplying address information having a length necessary for the extended address space.

BRIEF DESCRIPTION OF THE DRAWINGS

The invention may take physical form in certain parts and arrangements of parts which will be described in detail in the specification and illustrated in the accompanying drawings wherein.

DESCRIPTION OF THE PREFERRED EMBODIMENTS

Figure 1:
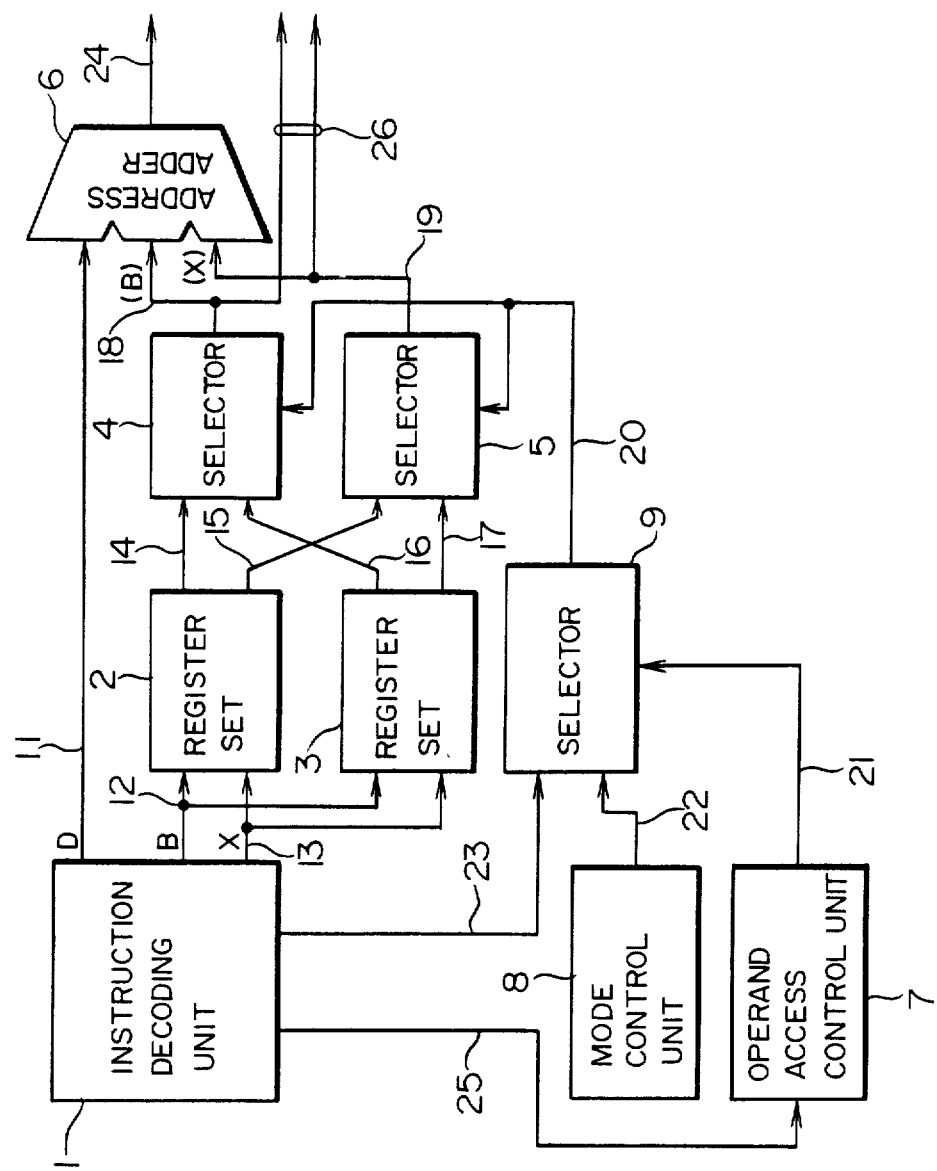
FIG. 1 is a block diagram schematically showing an operand address generate unit as an embodiment according to the present invention.

FIG. 1 shows a block diagram of an operand address generator as an embodiment according to the present invention. An instruction decoding unit 1 decodes an instruction so as to respectively output information items D, B, and X concerning an operand address to signal lines 11 to 13. The item D is a 12-bit value indicating a displacement with respect to a base address indicated by the content of the base register, the item B is a 4-bit value specifying the base register, and the item X is a 4-bit value designating an index register. The operand address is obtained as the sum of the value of D, the content of a general register specified by B (to be abbreviated as (B) hereinbelow), and the content of a general register specified by X (to be abbreviated as (X) hereinbelow).

The information items B and X are both supplied as register select signals to a register set 2 and a register set 3. The register set 2 includes 16 general registers used also in the conventional computer, whereas the register set 3 comprises 16 general registers additionally disposed to extend the operand address space. In this embodiment, the original address space is of a size of $2^{32}$ bytes and only the operand address space is expanded to $2^{64}$ bytes. In consequence, each register in the register set 2 is of a length of 32 bits, whereas each register of the register set 3 has a length of 64 bits.

The content of a register selected from the register set 2 based on the information item B and that of a register selected from the register set 3 depending on the information item B are respectively passed through signal lines 14 and 16 to a selector 4; whereas the content of a register selected from the register set 2 according to the information item X and that of a register set 3 selected depending on the information item X are respectively passed through signal lines 15 and 17 to a selector 5. The selectors 4 and 5 respectively select on output 14 or 15 from the register set 2 and an output 16 or 17 from the register 3. An address adder 6 is used to add the information item D on the signal line 11, the output on a signal line 18 from the selector 4, namely, (B), and the output on a signal line 19, namely, (X), thereby outputting an operand address to a signal line 24.

The instruction decoding unit 1 generates, when an instruction indicates an access to a memory to write or to read an operand of the instruction, a signal indicating the condition to a signal line 25. Furthermore, in a case where the instruction indicates an operation of a register, the instruction decoding unit 1 generates on a signal line 23 a signal indicating which one of the register sets 2 and 3 includes the register to be operated. The signal on the signal line 25 is sent to an operand access control unit 7, which then generates a signal having a value of "1" on a signal line 21 during a period of time in which a memory address of an operand is generated. The signal is used to control a select operation of a selector 9.

The selector 9 receives as an input thereto a signal on the signal line 23. The signal takes a value of "1" when the instruction indicates an operation of a register in the register set 3 and takes a value of "0" in other cases. Another input to the selector 9 is a signal on a signal line 22. The signal takes a value of "1" when the program status indicates a mode in which the operand address is to be extended. The selector 9 selects a mode signal from a mode control unit 8 when the signal on the signal line 21 is "1", namely, during a period of time in which a memory address of an operand is generated. In other cases, a register set specify signal on the signal line 23 is selected and is then passed through a signal line 20 to the selectors 4 and 5. If the signal on the signal line is "1", the selectors 4 and 5 selects an output from the register set 3; otherwise, an output from the register set 2 is selected.

Figure 2:
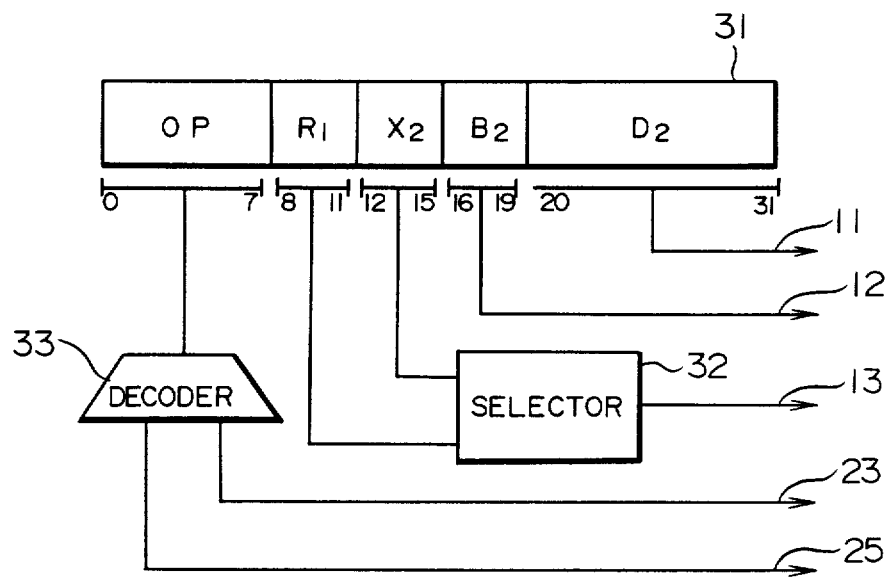
FIG. 2 is a schematic block diagram showing an instruction decoding unit of FIG. 1.

FIG. 2 shows a configuration of the instruction decoding unit 1 in which an instruction register 31 is used to keep an instruction being currently executed. In the instruction, bits 0 to 7 constitute an operation OP field and bits 8 to 11 form an $R_1$ field specifying a general register to keep a first operand. Bits 12 to 31 are used to store address information of a second operand in which bits 12 to 15 constitute an $X_2$ field specifying a general register to be used as an index register, bits 16 to 19 form a $B_2$ field specifying a general register to be used as a base register, and bits 20 to 31 form a $D_2$ field indicating a displacement value.

The content of the $D_2$ field is sent to the signal line 11, whereas the content of the $B_2$ field is transmitted to the signal line 12. The signal line 13 is supplied via a selector 32 with the content of the $R_1$ field when an access is being made to the first operand; whereas the content of the $X_2$ field is supplied when an address of the second operand is being generated. The content of the OP field is decoded by a decoder 33 so as to generate various control signals. However, in the configuration of FIG. 2, there are shown only connections to the signal lines 23 and 25 necessary for the description of the system.

Figure 3:
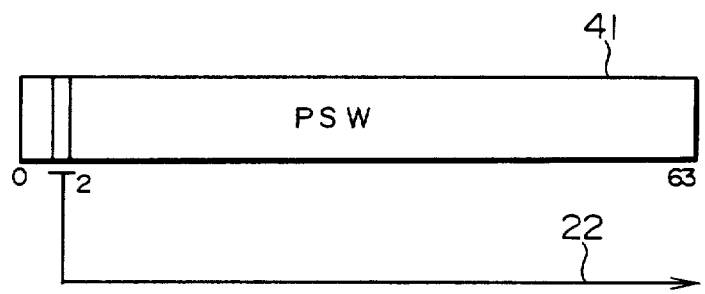
FIG. 3 is a block diagram showing a mode control unit of FIG. 1.

FIG. 3 shows a configuration of the mode control unit of FIG. 1 in which PSW 41 is a 64-bit register to keep program status information (program status word). The second bit of the PSW 41 is allocated to indicate an operand address space extend mode and the value of the second bit is transmitted to the signal line 22. In addition, the PSW 41 also includes an interruption mask, an instruction address, etc. However, such items are not directly related to the present invention and hence description thereof will be omitted. The contents of the PSW 41 are changed according to a PSW operate instruction. In consequence, whether or not the operand address space is to be extended can be arbitrarily specified by a program.

Next, description will be given of a process to generate an operand address in the configuration of FIG. 1. On receiving an instruction, the instruction decoding unit 1 respectively outputs address information items D, B, and X to the signal lines 11, 12, and 13 and sends signals having a value of "1" or "0" to the signal lines 23 and 25 depending on the content of the OP field. The register sets 2 and 3 respectively supply the signal lines 14 and 15 and the signal lines 16 and 17 with the contents of the registers specified by the information items B and X, respectively.

During a period of time where a memory address of an operand is generated, a signal having a value of "1" is sent from the operand access control unit 7 via the signal line 21 to the selector 9, which in turn selects a mode signal on the signal line 22 from the mode control unit 8 in response to the signal having a value of "1" such that the mode signal is applied via a signal line 20 to the selectors 4 and 5. In a mode in which the operand address space is to be extended, the signal possesses a value of "1"; in consequence, the selectors 4 and 5 select the outputs 16 and 17 from the register set 3 and send the outputs to the address adder 6. In other modes, however, the signal has a value of "0" and hence the selectors 4 and 5 select the outputs 14 and 15 from the register set 2.

In a period of time other than that to generate the operand memory address, the signal on the signal line 21 is "0". In response to this signal of "0", the selector 9 transmits a signal on the signal line 23 to the signal line 20. The signal is ordinarily "0", and in response thereto, the selectors 4 and 5 select the outputs 14 and 15 from the register set 2. In consequence, when an instruction is to be computed, the outputs from the register set 2 are employed.

Registers constituting the register set 2 have various usages other than the creation of an address, and therefore, these registers are directly referenced by use of various instructions. In such operations, the signal on the signal line 23 has also a value of "0". Registers in the register set 3 are also directly referenced according to additional instructions, for example, to set data thereto or to read data therefrom. When such a new instruction directly referencing the register is decoded, the signal on the signal line 23 is set to "1". The signal having a value of "1" selected by the selector 9 is used to control the selectors 4 and 5 so as to select the outputs from the register set 3. The outputs thus selected are delivered via a signal line 26 to an appropriate circuit. A data write mechanism for writing data in the register sets 2 and 3 is not directly related to the present invention and is consequently not shown in the drawings. However, it is to be appreciated by those skilled in the art that a circuit to input data to the respective register sets and-/or a circuit to write data therein are/is selectively operated by use of a signal on the signal line 23 so as to achieve a write operation on a register set thus specified.

According to the present invention, only the operand address space can be extended so as to greatly exceed the limit associated with the register length of the group of ordinary registers, thereby preserving an advantage of the approach in which only the operand address space is extended, namely, the amount of modifications to be effected on the existing software and the number of additional instructions are reduced.

We claim:

1. An address space switching apparatus comprising:
    address computing means for computing an address;
    a first group of registers for storing address information;

a second group of registers for storing address information that is longer than the address information stored in said first group of registers;

selector means controlled by a first control signal for respectively selecting, in response to a first state or a second state of the first control signal, an output from said first group of registers or said second group of registers in order to supply the selected output to said address computing means;

means for generating a second control signal indicating a time period during which an operand address is to be generated;

means for generating a third control signal indicating whether or not an operand address space is to be extended; and means responsive to the third control signal when the second control signal indicates the time period during which an operand address is to be generated for forcing the first control signal into the second state when the third signal indicates that an operand address space is to be extended and for forcing the first signal into the first state when the third signal indicates that an operand address space is not to be extended.

2. An address space switching apparatus according to claim 1, further comprising a first control signal generating means for generating the first control signal, said first control signal generating means comprising:

means for generating a fourth control signal indicating that one of the first and second groups of registers is to be accessed; and means responsive to the fourth control signal when the second control signal does not indicate the time period during which an operand address is to be generated for forcing the first control signal into the first state when the fourth control signal indicates that said first group of registers is to be accessed and for forcing the first control signal into the second state when the fourth control signal indicates that said second group of registers is to be accessed.

3. An address space switching apparatus according to claim 2, wherein said first group of registers and said second group of registers are for storing a base address.

4. An address space switching apparatus according to claim 3, wherein said first group of registers and said second group of registers are for storing an index value.

5. An address space switching apparatus according to claim 1, wherein said first group of registers and said second group of registers are for storing a base address.

6. An address space switching apparatus according to claim 5, wherein said first group of registers and said second group of registers are for storing an index value.

7. An address space switching apparatus for generating an operand address in both a first mode and a second mode, the first mode being a mode during which address expansion is executed and the second mode being a mode during which address expansion is not executed, said address space switching apparatus comprising:

address computing means for computing an address;

a first group of registers for storing address information;

a second group of registers for storing address information that is longer than the address information stored in said first group of registers;

selector means controlled by a first control signal for respectively selecting, in response to a first state or a second state of the first control signal, an output from the first group of registers or the second group of registers in order to supply the selected output to said address computing means;

mode specifying means for specifying one of the modes; and means responsive to the specified mode for forcing the first signal into the second state when the specified mode represents that an address expansion is to be made and for forcing the first signal into the first state when the specified mode represents that an address expansion is not to be made.

8. An address space switching apparatus according to claim 7, further comprising means for generating a second control signal indicating a period of time during which an operand address is to be generated, said first signal being generated by a first signal generating means activated by the second control signal.

9. An address space switching apparatus according to claim 7, wherein said mode specifying means includes a program status word register for storing a program status word and means for reading a bit that represents the specified mode from the program status word register, the bit constituting a portion of the program status word.

10. An address space switching apparatus comprising:

address computing means for computing an address;

a first group of registers, each of the registers of the first group for storing address information;

a second group of registers, each of the registers of the second group for storing address information that is longer than the address information stored in each of the registers of the first group;

selector means controlled by a first control signal for respectively selecting, in response to a first state or a second state of the first control signal, an output from the first group of registers or the second group of registers in order to supply the selected output to said address computing means;

means for generating a second control signal indicating a time period during which an operand address is to be generated; and means for receiving the second control signal and for generating the first control signal, the first control signal being in the second state in a period of time during which an operand address is to be generated and being in the first state during a period of time in which an address other than an operand address is to be generated.

* * * * *